(12) United States Patent
Kurisawa et al.

(10) Patent No.: US 8,202,447 B2
(45) Date of Patent: Jun. 19, 2012

(54) METHOD FOR PRODUCING LIQUID CRYSTAL COMPOSITION

(75) Inventors: Kazuki Kurisawa, Kounosu (JP); Kunihiko Kotani, Gyouda (JP)

(73) Assignee: DIC Corporation, Tokyo (JP)

( * ) Notice: Subject to any disclaimer, the term of this patent is extended or adjusted under 35 U.S.C. 154(b) by 316 days.

(21) Appl. No.: 12/450,036

(22) PCT Filed: Mar. 17, 2008

(86) PCT No.: PCT/JP2008/054879
§ 371 (c)(1),
(2), (4) Date: Sep. 9, 2009

(87) PCT Pub. No.: WO2008/117692
PCT Pub. Date: Oct. 2, 2008

(65) Prior Publication Data
US 2010/0012896 A1  Jan. 21, 2010

(30) Foreign Application Priority Data

Mar. 23, 2007 (JP) ................. 2007-076676
Mar. 23, 2007 (JP) ................. 2007-076677

(51) Int. Cl.
*C09K 19/00* (2006.01)
*C09K 19/06* (2006.01)
*C09K 19/52* (2006.01)

(52) U.S. Cl. ........ 252/299.01; 430/20; 428/1.1; 345/87; 349/1; 349/56; 349/187

(58) Field of Classification Search ........................ None
See application file for complete search history.

(56) References Cited

U.S. PATENT DOCUMENTS 5,330,679 A  7/1994  Sasaki et al.

FOREIGN PATENT DOCUMENTS

| JP | 57-028182 A | 2/1982 |
| JP | 05-105876 A | 4/1993 |
| JP | 06-071110 A | 3/1994 |
| JP | 2002-194356 A | 7/2002 |
| JP | 2006-136868 A | 6/2006 |

OTHER PUBLICATIONS

International Search Report mailed Jun. 3, 2008, issued on PCT/JP2008/054879.

*Primary Examiner* — Geraldina Visconti
(74) *Attorney, Agent, or Firm* — Edwards Wildman Palmer LLP; James E. Armstrong, IV; Nicholas J. DiCeglie, Jr.

(57) ABSTRACT

The present invention provides a method for producing a liquid crystal composition which mixes two or more liquid crystal compounds, namely, a method for producing a liquid crystal composition, including conducting agitation or ultrasonic irradiation of two or more liquid crystal compounds without applying external heat, wherein at least one of the liquid crystal compounds has a melting point higher than 40° C., and a temperature at a start of the agitation or ultrasonic irradiation is not more than 40° C. The production method of the present invention enables a highly reliable, high-quality liquid crystal composition to be produced without the necessity for large-scale equipment such as a pressure reduction apparatus or heating apparatus. Accordingly, this method is extremely practical for the production of liquid crystal compositions that require a high level of reliability.

9 Claims, No Drawings

METHOD FOR PRODUCING LIQUID CRYSTAL COMPOSITION

TECHNICAL FIELD

The present invention relates to a method for producing a liquid crystal composition that is useful as a constituent for a liquid crystal display element.

BACKGROUND ART

Liquid crystal display elements have become widely used, not only in watches and pocket calculators, but in all manner of measuring equipment, motor vehicle display panels, word processors, personal digital assistants, printers, computers and televisions and the like. Representative examples of liquid crystal display systems include TN (twisted nematic), STN (super twisted nematic), DS (dynamic scattering) and GH (guest-host) systems, as well as a FLC (ferroelectric liquid crystal) system which enables high-speed response. Furthermore, in terms of the drive system employed, conventional static drive and multiplex drive systems are the most typical, although simple matrix drive systems, and more recently active matrix drive systems, are now also being used in practical applications.

The liquid crystal compositions used in these types of systems are typically prepared by mixing two or more compounds, wherein the mixing ratio is determined so as to achieve physical properties (such as the nematic phase temperature range, the birefringent index ($\Delta n$), the dielectric anisotropy ($\Delta \in$), the viscosity, and the elastic constant) and electro-optical properties (such as the response time, the threshold voltage, and the steepness of the V-T curve) for the liquid crystal composition that are appropriate for the targeted liquid crystal element display system and drive system. In most cases, the composition must have a high level of reliability when exposed to heat, light or moisture or the like. Further, in the case of an active matrix drive system, it is important that the liquid crystal composition also exhibits a satisfactorily high voltage holding ratio (VHR). In order to enhance the reliability, resistivity and voltage holding ratio (VHR) of a liquid crystal composition, a high level of reliability and a high voltage holding ratio (VHR) must be achieved for each of the liquid crystal compounds that constitute the composition. However, even if compounds having high levels of reliability, resistivity and voltage holding ratio (VHR) are used, the quality may deteriorate during production of the mixture of the compounds that functions as the liquid crystal composition.

Examples of the method used for producing the liquid crystal composition include methods that employ melt mixing under heat, and methods in which the liquid crystal compounds are dissolved in an organic solvent to effect mixing, and the organic solvent is then removed (see Patent Document 1). However, with these proposed methods, the quality of the composition often deteriorates. For example, in melt mixing method under heat, oxygen may cause oxidative decomposition of the liquid crystal compounds during the heating, resulting in a marked reduction in the resistivity and/or voltage holding ratio (VHR) of the liquid crystal composition. Moreover, the upper limit temperature of a liquid crystalline phase tends to fall, and the physical properties and electro-optical properties of the composition may change. In an organic solvent dissolution method, impurities or dopants within the organic solvent may cause a marked reduction in the resistivity and/or voltage holding ratio (VHR) of the liquid crystal composition. Moreover, residual solvent resulting from incomplete removal of the organic solvent also tends to cause a decrease in the resistivity of the liquid crystal composition and a marked reduction in the voltage holding ratio. On the other hand, production methods in which heating is conducted at a comparatively low temperature in a state of reduced pressure have also been proposed, and the production of liquid crystal compositions having a low resistance value have been disclosed (see Patent Document 2). However, although the method disclosed in the cited document enables production to be conducted at a comparatively low temperature, heating is still required, meaning the adverse effects associated with heating cannot be eliminated entirely, and heating equipment is still necessary. Moreover, another problem arises in that the method disclosed in the cited document also requires a large apparatus associated with the pressure reduction. In other words, in order to enable the liquid crystal compounds to be melted under reduced pressure, a container capable of withstanding the reduced pressure conditions is necessary, meaning the production apparatus inevitably becomes a large apparatus capable of withstanding reduced pressure. Further, pressure reduction is usually achieved using a vacuum pump, but this means that a trap must be provided to prevent backflow of the oil mist used in the vacuum pump, and a cooling device must also be provided to cool the trap. In this manner, production of a liquid crystal composition under reduced pressure tends to result in a significant enlargement of the production equipment, which would necessitate enormous capital investment to keep up with the increasing demand for liquid crystal compositions.

On the other hand, in recent years, high-speed response has become a much demanded property for liquid crystal compositions. In order to achieve such a high-speed response, a liquid crystal compound having a comparatively small molecular weight must be added. If preparation of the liquid crystal composition is conducted under reduced pressure, then a liquid crystal compound having a comparatively small molecular weight tends to volatilize, causing a change in the mixing ratio of the composition. Accordingly, the method disclosed in the above cited document is unsuitable for the production of liquid crystal compositions containing a liquid crystal compound having a comparatively small molecular weight.

Examples of known devices for agitating liquids include planetary mixing devices (see Patent Document 3), vibrators, lab mixers, stirring propellers, shakers and rotary evaporators. However, these agitating devices are typically designed as being used for the agitation of liquid crystal compounds in a liquid phase, and not designed as being used for the agitation of liquid crystal compounds in a powder form.

As described above, the development of a method for efficiently producing a high-quality liquid crystal composition using simplified equipment has been keenly sought.

Patent Document 1: Japanese Unexamined Patent Application, First Publication No. Hei 5-105876 (page 5, right column)

Patent Document 2: Japanese Unexamined Patent Application, First Publication No. 2002-194356 (page 4, Examples)

Patent Document 3: Japanese Unexamined Patent Application, First Publication No. Hei 6-71110 (Claim 3)

DISCLOSURE OF INVENTION

Problems to be Solved by the Invention

An object of the present invention is to provide a method that is capable of efficiently producing a liquid crystal composition obtained by mixing two or more liquid crystal compounds, wherein the produced liquid crystal composition has a high level of reliability.

Means to Solve the Problems

As a result of intensive investigation aimed at achieving the above object, the inventors of the present invention were able to complete the present invention. The present invention provides a method for producing a liquid crystal composition that includes conducting agitation or ultrasonic irradiation of two or more liquid crystal compounds without applying external heat, wherein at least one of the liquid crystal compounds has a melting point higher than 40° C., and the temperature at the start of the agitation or ultrasonic irradiation is not more than 40° C.

Effect of the Invention

The production method of the present invention enables a highly reliable, high-quality liquid crystal composition to be produced without the necessity for large-scale equipment such as a pressure reduction apparatus or heating apparatus. Accordingly, this method is extremely practical for the production of liquid crystal compositions that require a high level of reliability.

BEST MODE FOR CARRYING OUT THE INVENTION

The production method of the present invention is conducted without using an external heating device, so that the temperature at the start of the agitation or ultrasonic irradiation is not more than 40° C., and this start temperature is preferably not more than 35° C., and still more preferably 30° C. or lower. Although there are no particular restrictions on the lower limit for the temperature at the start of the agitation or ultrasonic irradiation, from a practical perspective, the temperature is preferably at least 15° C., and is more preferably 20° C. or higher. In other words, the temperature at the start of the agitation or ultrasonic irradiation is preferably not less than 15° C. and not more than 40° C., is more preferably not less than 20° C. and not more than 40° C., is still more preferably not less than 20° C. and not more than 35° C., and is most preferably not less than 20° C. and not more than 30° C.

A feature of the production method of the present invention is the fact that no heating device is used. However, in those cases where production is conducted at a temperature lower than room temperature in order to place a particular emphasis on the quality of the produced liquid crystal composition, or in cases where the mixing results in the generation of heat, or the agitation or ultrasonic irradiation causes a rise in temperature, a cooling device is preferably used to control the temperature within a specified temperature range.

As mentioned above, the temperature may rise during production, following the start of agitation or ultrasonic irradiation. In such cases, the temperature is preferably not less than 15° C. and not more than 50° C., more preferably not less than 20° C. and not more than 45° C., and is most preferably not less than 25° C. and not more than 40° C.

Although there are no particular restrictions on the production time, from a practical perspective the time is preferably not more than 5 hours, more preferably not more than 4 hours, and still more preferably 3 hours or less. Further, if the production time is too short, then there is a possibility that fine particles of the liquid crystal compounds may remain within the composition, and therefore in those cases where the production is conducted using an agitating device, the production time is preferably at least 15 minutes, and more preferably 30 minutes or longer, whereas in those cases where production is conducted using ultrasonic irradiation, the irradiation is preferably performed for at least 15 minutes, and more preferably 30 minutes or longer.

The production method of the present invention is capable of producing liquid crystal compositions at low temperatures, and therefore a high-quality liquid crystal composition can be produced even in the atmosphere. However, in order to produce an even higher quality liquid crystal composition, production is preferably conducted under sealed conditions, and is more preferably conducted under an atmosphere of an inert gas. Rare gases such as helium, neon or argon, or nitrogen gas can be used favorably as the inert gas.

The gas that makes contact with the liquid crystal composition during production is air in those cases where production is conducted under atmospheric conditions, or is an inert gas in those cases where production is conducted under an atmosphere of inert gas. The pressure of the gas is typically either equal to atmospheric pressure or a weakly pressurized state. Specifically, the pressure if preferably within a range from 0.95 atmospheres to 1.05 atmospheres.

Examples of agitating devices that may be used in the production method of the present invention include planetary mixing devices, vibrators, lab mixers, stirring propellers, shakers and rotary evaporators. Of these, a planetary mixing device is preferred. In the present invention, the term "planetary mixing device" refers to an agitating device in which the vessel containing the material is revolved while undergoing free rotation, and is also known as a rotation/revolution type agitating device. Further, because the planetary mixing device also has a defoaming function, it is also known as a planetary mixing and defoaming device. Besides this agitating device, an ultrasonic irradiation device may be used.

Although there are no particular restrictions on the liquid crystal composition produced using the production method of the present invention, at least one of the liquid crystal compounds that constitute the composition must have a melting point higher than 40° C., and the production method is more effective for the production of liquid crystal compositions in which at least two compounds have melting points higher than 40° C., and is particularly effective for the production of liquid crystal compositions in which at least three compounds have melting points higher than 40° C.

The production method of the present invention is particularly effective for the production of liquid crystal compositions having a large proportion of compounds having a melting point higher than 40° C. This proportion of compounds having a melting point higher than 40° C. is preferably at least 60%, more preferably at least 70%, and still more preferably 80% or more.

In relation to the melting points of the constituent liquid crystal compounds, at least one compound having a melting point higher than 40° C. is required, but the present invention is effective for the production of liquid crystal compositions containing at least one compound having a melting point of 45° C. or higher, is more effective for the production of liquid crystal compositions containing at least one compound having a melting point of 50° C. or higher, and is particularly effective for the production of liquid crystal compositions containing at least one compound having a melting point of 60° C. or higher.

Because the present invention does not use a pressure reduction device during production, it is effective for the production of liquid crystal compositions containing a large amount of liquid crystal compounds having a comparatively small molecular weight, which tend to volatilize when production is conducted under reduced pressure.

In terms of the molecular weight of the constituent liquid crystal compounds, the method of the present invention is effective for the production of liquid crystal compositions containing compounds having a molecular weight of 300 or less, and is particularly effective for the production of liquid crystal compositions containing compounds having a molecular weight of 250 or less.

The liquid crystal compounds contained within the liquid crystal composition produced using the production method of the present invention are preferably compounds represented by general formula (I) shown below:

[Chemical Formula 1]

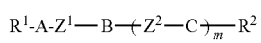
(I)

wherein $R^1$ and $R^2$ each independently represents an alkyl group of 1 to 16 carbon atoms, an alkoxyl group of 1 to 16 carbon atoms, an alkenyl group of 2 to 16 carbon atoms or an alkenyloxy group of 3 to 16 carbon atoms, which may be substituted with fluorine, A, B and C each independently represents a 1,4-phenylene group, 2- or 3-fluoro-1,4-phenylene group, 2,3-difluoro-1,4-phenylene group, 3,5-difluoro-1,4-phenylene group, 2- or 3-chloro-1,4-phenylene group, 2,3-dichloro-1,4-phenylene group, 3,5-dichloro-1,4-phenylene group, 2-methyl-1,4-phenylene group, 3-methyl-1,4-phenylene group, naphthalene-2,6-diyl group, phenanthrene-2,7-diyl group, fluorene-2,7-diyl group, trans-1,4-cyclohexylene group, 1,2,3,4-tetrahydronaphthalene-2,6-diyl group, decahydronaphthalene-2,6-diyl group, trans-1,3-dioxane-2,5-diyl group, pyridine-2,5-diyl group, pyrimidine-2,5-diyl group, pyrazine-2,5-diyl group or pyridazine-2,5-diyl group, wherein these groups may be substituted with 1 to 3 fluorine atoms, m represents 0, 1 or 2, $Z^1$ and $Z^2$ each independently represents a single bond, —$CH_2CH_2$—, —$(CH_2)_4$—, —$OCH_2$—, —$CH_2O$—, —COO—, —CH═CH—, —CF═CF—, —CH═N—N═CH— or —C≡C—, and when m is 2, the two $Z^2$ and C groups may be either the same or different.

Of these, the method of the present invention is ideal for the production of liquid crystal compositions containing compounds having a comparatively small molecular weight or a high volatility. Specifically, the production of a liquid crystal composition containing a compound in which m is 0 is preferred, the production of a liquid crystal composition containing a compound in which $R^1$ and $R^2$ each independently represents an alkyl group of 1 to 5 carbon atoms or an alkenyl group of 2 to 5 carbon atoms, A and B each independently represents a 1,4-phenylene group, 2- or 3-fluoro-1,4-phenylene group, 2,3-difluoro-1,4-phenylene group, 3,5-difluoro-1,4-phenylene group or trans-1,4-cyclohexylene group, and m is 0 is more preferred, and the production of a liquid crystal composition containing a compound in which $R^1$ and $R^2$ each independently represents an alkyl group of 1 to 5 carbon atoms or an alkenyl group of 2 to 5 carbon atoms, A and B represent trans-1,4-cyclohexylene groups, and m is 0 is particularly preferred.

EXAMPLES

A more detailed description of the present invention is presented below using a series of examples, although the present invention is in no way limited by these examples.

The shaker used in the examples was a TUBE MIXER MODEL TMS manufactured by As One Corporation, and the planetary mixing device used was a MAZERUSTAR KK-100 manufactured by Kurabo Industries Ltd. Further, the ultrasonic irradiation used was a MUS-10 manufactured by Toyo Rikakikai Co., Ltd (EYELA).

Analysis of the prepared liquid crystal compositions was conducted using the following apparatus.

Gas chromatography: HP6890, manufactured by Hewlett-Packard Development Company.

Example 1

Production of Liquid Crystal Composition Using Shaker

A liquid crystal composition (STN1, liquid crystal upper limit temperature: 135.5° C.) composed of the following compounds was produced. The list below also shows the amount used and the melting point of each compound.

[Chemical Formula 2]

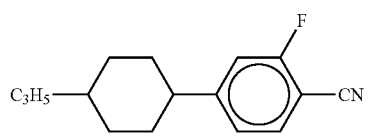

15 g    41.9° C.

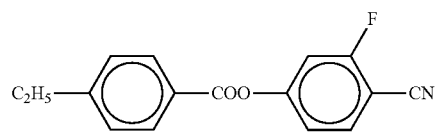

3 g    78.7° C.

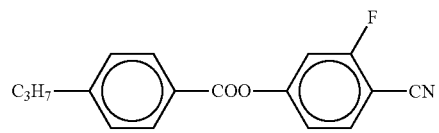

3 g    70.8° C.

-continued

| Structure | Amount | Temp |
|---|---|---|
| 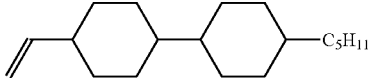 | 5 g | 64.4° C. |
| 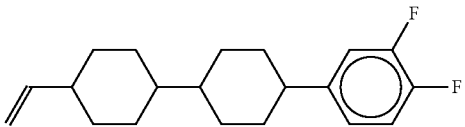 | 20 g | 108.6° C. |
| 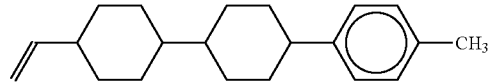 | 4 g | 106.7° C. |
| 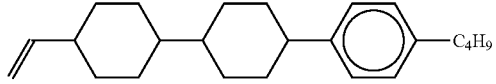 | 8 g | 176.6° C. |
| 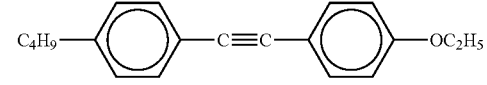 | 4 g | 80.2° C. |
| 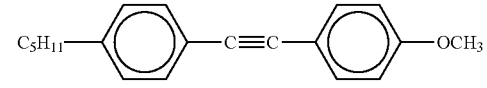 | 4 g | 57.6° C. |
| 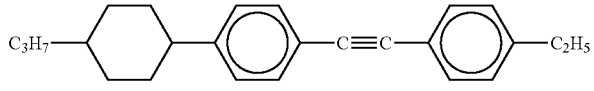 | 6 g | 206.7° C. |
| 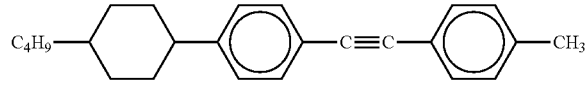 | 6 g | 202.7° C. |
| 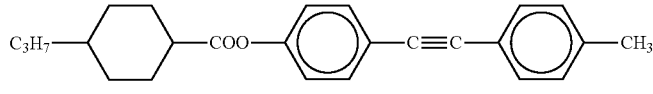 | 6 g | 229.6° C. |
| 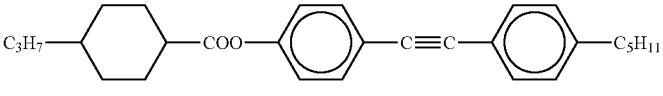 | 6 g | 211.8° C. |
| 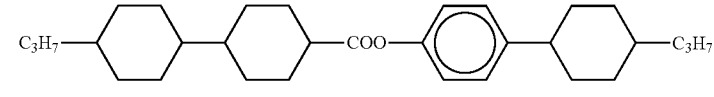 | 5 g | |
| 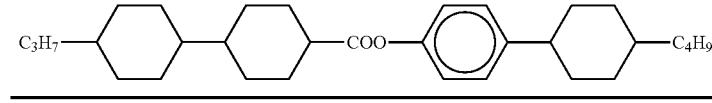 | 5 g | |

Each of the above liquid crystal compounds was weighed into a shaking container. Nitrogen gas was then introduced into the container, and the container was sealed. The container was then shaken at room temperature (25° C.) using a shaker. After a lapse of 2 hours from the start of the shaking, the liquid crystal compounds show the liquid crystalline phase, and the shaking was stopped, yielding 100 g of the STN1 in a liquid crystalline phase. The temperature of the composition at this point was not higher than 40° C.

Measurement of the resistivity of the prepared liquid crystal composition revealed a result of $1.4 \times 10^{12}$ Ωcm. Further, analysis of the composition by gas chromatography revealed no contamination or generation of substances other than the blended compounds, and no decomposition of the blended compounds was observed. Measurement of the physical properties of the liquid crystal composition yielded desirable results. When the liquid crystal was injected into a STN panel and the electro-optical properties were measured, desirable results were obtained. The production method of the present invention enables a high-quality liquid crystal composition to be produced without the use of a pressure reduction apparatus or heating apparatus that requires large equipment.

Comparative Example 1

Production of Liquid Crystal Composition using Heat 1

A liquid crystal composition (STN1) having the same liquid crystal upper limit temperature of 135.5° C. as Example 1 was produced by heating under atmospheric pressure, in accordance with the method disclosed in Japanese Unexamined Patent Application, First Publication No. Hei 5-105876. The prescribed liquid crystal compounds were first weighed into a flask. A magnetic stirring bar was placed inside the flask, the flask was placed on a hotplate at 50° C., and the mixture was stirred by rotating the stirring bar, while the temperature of the hotplate was increased to 145° C. at a rate of 5° C./minute. Subsequently, 30 minutes after the liquid crystal compounds had showed an isotropic liquid phase and become transparent, the hotplate heating was stopped, and the composition was gradually returned to room temperature. The flask was then removed from the hotplate, yielding 100 g of the STN1 in a nematic liquid crystalline phase.

Measurement of the resistivity of the prepared liquid crystal composition revealed a result of $1.5 \times 10^9$ Ωcm, which represents a marked reduction in the resistivity. The production method of Comparative Example 1 uses a simple production apparatus, but suffers from a dramatic reduction in the resistivity of the produced liquid crystal composition. Further, analysis of the produced liquid crystal composition by gas chromatography revealed a multitude of substances other than the blended compounds. Analysis of the decomposition products using a mass analyzer confirmed that the liquid crystal compounds that constituted the liquid crystal composition were undergoing oxidative decomposition. Measurement of the liquid crystal upper limit temperature revealed a reduced temperature of 134.5° C., which represents a large deterioration in the liquid crystal quality.

Comparative Example 2

Production of Liquid Crystal Composition Under Reduced Pressure 1

The same liquid crystal composition (STN1) as Example 1 was produced in accordance with the method disclosed in Japanese Unexamined Patent Application, First Publication No. 2002-194356.

The prescribed liquid crystal compounds were first weighed into a round bottom flask. The round bottom flask was then connected to a rotary evaporator. The round bottom flask was then immersed in an oil bath at 50° C. and rotated. Using a vacuum pump, the pressure inside the rotary evaporator was gradually reduced to 20 kPa over a period of 5 minutes. The temperature of the oil bath was then raised to 145° C. at a rate of 5° C./minute. Subsequently, 30 minutes after the liquid crystal compounds had showed a liquid phase and become transparent, the oil bath was replaced with a water bath, and the flask was cooled. Once the temperature had fallen to room temperature, the flask rotation was stopped, and the pressure reduction was stopped. Following returning of the inside of the flask to atmospheric pressure by introducing nitrogen gas, the round bottom flask was removed from the rotary evaporator, yielding 100 g of the STN1 in a nematic liquid crystalline phase.

Measurement of the resistivity of the prepared liquid crystal composition revealed a result of $1.4 \times 10^{12}$ Ωcm. Further, analysis of the composition by gas chromatography revealed no contamination or generation of substances other than the blended compounds, and no decomposition of the blended compounds was observed. Measurement of the physical properties of the liquid crystal composition yielded desirable results. When the liquid crystal was injected into a STN panel and the electro-optical properties were measured, desirable results were obtained. However, slight volatilization of the compounds having comparatively low molecular weights was observed, and the composition of the liquid crystal composition was changed. In particular, a change in the amount of the compound of the above general formula (I) in which $R^1$ represents an alkyl group of 5 carbon atoms, $R^2$ represents an alkenyl group of 2 carbon atoms, A and B represent trans-1,4-cyclohexylene groups, $Z^1$ is a single bond and m is 0 (namely, the fourth compound from the top of the list in STN1) was confirmed. Further, the production required the use of a pressure reduction apparatus and heating apparatus that required large equipment.

Example 2

Production of Liquid Crystal Composition Using Planetary Mixing Device

A liquid crystal composition (STN2, liquid crystal upper limit temperature: 101.2° C.) composed of the following compounds was produced. The list below also shows the amount used and the melting point of each compound.

[Chemical Formula 3]

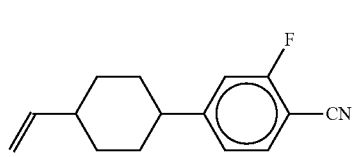
8 g    50.3° C.

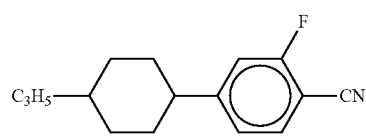
20 g    41.9° C.

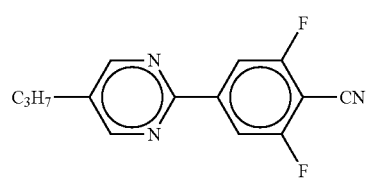
7 g    68.7° C.

-continued

| Structure | Amount | Temp |
|---|---|---|
| vinyl-Cy-Cy-C5H11 | 13 g | 64.4° C. |
| vinyl-Cy-Cy-Ph(3,4-diF) | 9 g | 108.6° C. |
| vinyl-Cy-Cy-Ph-CH3 | 12 g | 161.7° C. |
| vinyl-Cy-Cy-Ph-C4H9 | 13.5 g | 176.6° C. |
| C3H7-Cy-Ph-C≡C-Ph-C2H5 | 5.5 g | 206.7° C. |
| C4H9-Cy-Ph-C≡C-Ph-CH3 | 4 g | 202.7° C. |
| C3H7-Cy-Cy-COO-Ph-Cy-C2H5 | 2 g | |
| C3H7-Cy-Cy-COO-Ph-Cy-C3H7 | 3 g | |
| C3H7-Cy-Cy-COO-Ph-Cy-C4H9 | 3 g | |

Each of the above liquid crystal compounds was weighed into a agitating container. Nitrogen gas was then introduced into the container, and the container was sealed. The contents of the container were then agitated at room temperature (25° C.) using a planetary mixer. After a lapse of 60 minutes from the start of the agitation, the liquid crystal compounds show the liquid crystalline phase, and the agitation was stopped, yielding 100 g of the STN2 in a liquid crystalline phase. The temperature of the composition at this point was not higher than 40° C.

Measurement of the resistivity of the prepared liquid crystal composition revealed a result of $1.6 \times 10^{11}$ Ωcm. Further, analysis of the composition by gas chromatography revealed no contamination or generation of substances other than the blended compounds, and no decomposition of the blended compounds was observed. Measurement of the physical properties of the liquid crystal composition yielded desirable results. When the liquid crystal was injected into a STN panel and the electro-optical properties were measured, desirable results were obtained.

Comparative Example 3

Production of Liquid Crystal Composition Using Heat 2

100 g of the same liquid crystal composition (STN2, liquid crystal upper limit temperature: 101.2° C.) was produced using the same method as Comparative Example 1. Measurement of the resistivity of the prepared liquid crystal composition revealed a result of $1.1 \times 10^{9}$ Ωcm, which represents a marked reduction in the resistivity. Analysis of the produced liquid crystal composition by gas chromatography revealed a multitude of substances other than the blended compounds. Analysis of the decomposition products using a mass analyzer confirmed that the liquid crystal compounds that constituted the liquid crystal composition were undergoing oxidative decomposition. Further, measurement of the liquid crystal upper limit temperature revealed a reduced temperature of 100.1° C., which represents a large deterioration in the liquid crystal quality.

Comparative Example 4

Production of Liquid Crystal Composition Under Reduced Pressure 2

100 g of the same liquid crystal composition (STN2) was produced using the same method as Comparative Example 2. Measurement of the resistivity of the prepared liquid crystal composition revealed a result of $1.6 \times 10^{11}$ Ωcm. Further, analysis of the composition by gas chromatography revealed no contamination or generation of substances other than the blended compounds, and no decomposition of the blended compounds was observed. Measurement of the physical properties of the liquid crystal composition yielded desirable results. When the liquid crystal was injected into a STN panel and the electro-optical properties were measured, desirable results were obtained. However, slight volatilization of the compounds having comparatively low molecular weights was observed, and the composition of the liquid crystal composition was changed. In a similar manner to Comparative Example 2, a change in the amount of the compound of the above general formula (I) in which $R^1$ represents an alkyl group of 5 carbon atoms, $R^2$ represents an alkenyl group of 2 carbon atoms, A and B represent trans-1,4-cyclohexylene groups, $Z^1$ is a single bond and m is 0 (namely, the fourth compound from the top of the list in STN2) was confirmed.

Furthermore, the production required the use of a pressure reduction apparatus and heating apparatus that required large equipment.

Example 3

Production of Liquid Crystal Composition Using Ultrasonic Irradiation Device 1

The above-mentioned liquid crystal composition (STN1, liquid crystal upper limit temperature: 135.5° C.) was produced.

The prescribed weight of each of the liquid crystal compounds was weighed into a round bottom flask with a capacity of 200 ml. The round bottom flask was then set in an ultrasonic irradiation device, and ultrasonic irradiation was conducted at room temperature (25° C.) with no external heat application. After 60 minutes irradiation, the ultrasonic irradiation was stopped, and the temperature of the composition at this point was not higher than 40° C. The round bottom flask was then removed from the ultrasonic irradiation device, yielding 100 g of the STN1 in a nematic liquid crystalline phase.

Measurement of the resistivity of the prepared liquid crystal composition revealed a result of $1.4 \times 10^{12}$ Ωcm. Further, analysis of the liquid crystal composition by gas chromatography revealed no contamination or generation of substances other than the blended compounds, and no decomposition of the blended compounds was observed. Measurement of the physical properties of the liquid crystal composition yielded desirable results. When the liquid crystal was injected into a STN panel and the electro-optical properties were measured, desirable results were obtained.

The production method of the present invention enables a high-quality liquid crystal composition to be produced without the use of a pressure reduction apparatus or heating apparatus that requires large equipment.

Example 4

Production of Liquid Crystal Composition Using Ultrasonic Irradiation Device 2

The above-mentioned liquid crystal composition (STN2, liquid crystal upper limit temperature: 101.2° C.) was produced.

The prescribed weight of each of the liquid crystal compounds was weighed into a round bottom flask with a capacity of 200 ml. The round bottom flask was then set in an ultrasonic irradiation device, and ultrasonic irradiation was conducted at room temperature (25° C.) with no external heat application. After 60 minutes irradiation, the ultrasonic irradiation was stopped, and the temperature of the composition at this point was not higher than 40° C. The round bottom flask was then removed from the ultrasonic irradiation device, yielding 100 g of the STN2 in a nematic liquid crystalline phase. Measurement of the resistivity of the prepared liquid crystal composition revealed a result of $1.6 \times 10^{11}$ Ωcm. Further, analysis of the liquid crystal composition by gas chromatography revealed no contamination or generation of substances other than the blended compounds, and no decomposition of the blended compounds was observed. Measurement of the physical properties of the liquid crystal composition yielded desirable results. When the liquid crystal was injected into a STN panel and the electro-optical properties were measured, desirable results were obtained.

The invention claimed is:

1. A method for producing a liquid crystal composition, comprising
conducting agitation or ultrasonic irradiation of two or more liquid crystal compounds without applying external heat, wherein
at least one of the liquid crystal compounds has a melting point higher than 40° C., and
the temperature at the start of the agitation or ultrasonic irradiation is not more than 40° C.

2. A method for producing a liquid crystal composition according to claim 1, wherein at least two of the liquid crystal compounds have a melting point higher than 40° C.

3. A method for producing a liquid crystal composition according to claim 1, wherein a proportion of compounds that have a melting point higher than 40° C. is at least 60%.

4. A method for producing a liquid crystal composition according to claim 1, wherein the temperature at the start of the agitation or ultrasonic irradiation is not less than 15° C. and not more than 40° C.

5. A method for producing a liquid crystal composition according to claim 1, wherein the time of the agitation or ultrasonic irradiation is not more than 5 hours.

6. A method for producing a liquid crystal composition according to claim 1, wherein the agitation or ultrasonic irradiation is conducted under an atmosphere of an inert gas.

7. A method for producing a liquid crystal composition according to claim 1, wherein the agitation is conducted using a planetary mixing device, vibrator, lab mixer, stirring propeller, shaker or rotary evaporator.

8. A method for producing a liquid crystal composition according to claim 1, wherein the ultrasonic irradiation is conducted using an ultrasonic irradiation device.

9. A method for producing a liquid crystal composition according to claim 7, wherein the agitation is conducted using the planetary mixing device.

* * * * *